Jan. 2, 1923.

B. LAWRENCE.
TRANSMISSION GEAR FOR MOTOR VEHICLES.
FILED MAR. 20, 1922.

Inventor
B. Lawrence
by Wilkinson & Ginsta
Attorneys.

Jan. 2, 1923.

B. LAWRENCE.
TRANSMISSION GEAR FOR MOTOR VEHICLES.
FILED MAR. 20, 1922.

Inventor
B. Lawrence
by Wilkinson & Giusta
Attorneys.

Patented Jan. 2, 1923.

1,441,099

UNITED STATES PATENT OFFICE.

BENJAMIN LAWRENCE, OF LONDON, ENGLAND.

TRANSMISSION GEAR FOR MOTOR VEHICLES.

Application filed March 20, 1922. Serial No. 545,292.

*To all whom it may concern:*

Be it known that I, BENJAMIN LAWRENCE, a subject of the King of Great Britain, and resident of London, England, have invented certain new and useful Improvements in Transmission Gears for Motor Vehicles, of which the following is a specification.

This invention relates to transmission gear for motor vehicles and has for its object to provide means for preventing the unintentional engagement of the driving gear, more particularly in that type of vehicle where a pedal lever is used to control both the clutch and the epicyclic or low gear.

It is usually arranged that such a pedal lever, when in its raised position, allows engagement of the direct driving clutch. Slightly depressing the pedal causes the clutch to be released so that the drive is no longer transmitted from the engine, but further depression of the pedal brings into operation an epicyclic train of gears which constitute the low gear drive.

There is always a danger of depressing the pedal too far when it is desired only to release the clutch and bring the vehicle to rest, especially is this the case when an emergancy arises and a sudden stop is necessary.

To overcome this disadvantage there is provided according to the present invention a movable stop which may be brought into such a position that it engages with the pedal lever or with some part connected thereto when the pedal has been depressed sufficiently to release the driving clutch, and prevents further downward movement thereof. Thus the low driving gear cannot be brought into operation without first moving the stop out of its operative position.

An operating rod actuated from a point accessible to the driver is connected to the movable stop so that it may be readily moved, and the said stop is so arranged that when released it is returned by a spring into its operative position.

Moreover a locking device is provided which retains the movable stop in its inoperative position, after having been so placed, until the pedal has first been depressed past its central or free position, such depression of the pedal causing the release of the movable stop. The parts are so arranged that the movable stop cannot return to its operative position, although released, until the pedal has been allowed to rise to about its central position after having been further depressed. Thus the low gear may be engaged and released repeatedly without the necessity of operating the movable stop each time, unless the pedal is allowed to rise to its central position.

In order that my invention may be more readily understood and conveniently carried into effect I have illustrated an apparatus constructed in accordance therewith in the accompanying drawing wherein similar reference characters relate to corresponding parts throughout the several figures thereof and in which—

Referring to the said drawings it will be seen that the apparatus therein illustrated comprises a base plate $a$ attached by any suitable means such at the set screws $b$ and the plate $c$ to the footboard $d$ of a motor vehicle, the dash board of which is indicated at $e$ and the steering column at $f$; $g$ representing the pedal for control of the clutch and the gears.

The movable stop previously referred to, in the embodiment illustrated, takes the form of a plate $i$ slidably mounted on the base $a$ and normally projected forwardly or in the path of the lug $j$ carried by the pedal $g$ by the helical spring $k$ encircling the rod $l$ rotatably mounted in the standards $m$ integral with the base plate $a$ and provided with the fixed collars $n$ which prevent longitudinal movement of the rod $l$.

One end of the rod $l$ is bent downwards and forwards to engage in the flanged slot $o$ of the plate $i$ while the other end is formed with a right angle bend and a flattened extremity to which the lower end of the connecting rod $p$ is attached the upper end of the rod $p$ being secured to the trigger lever $r$ pivotally mounted at $s$ to the steering column $f$.

Figure 1:
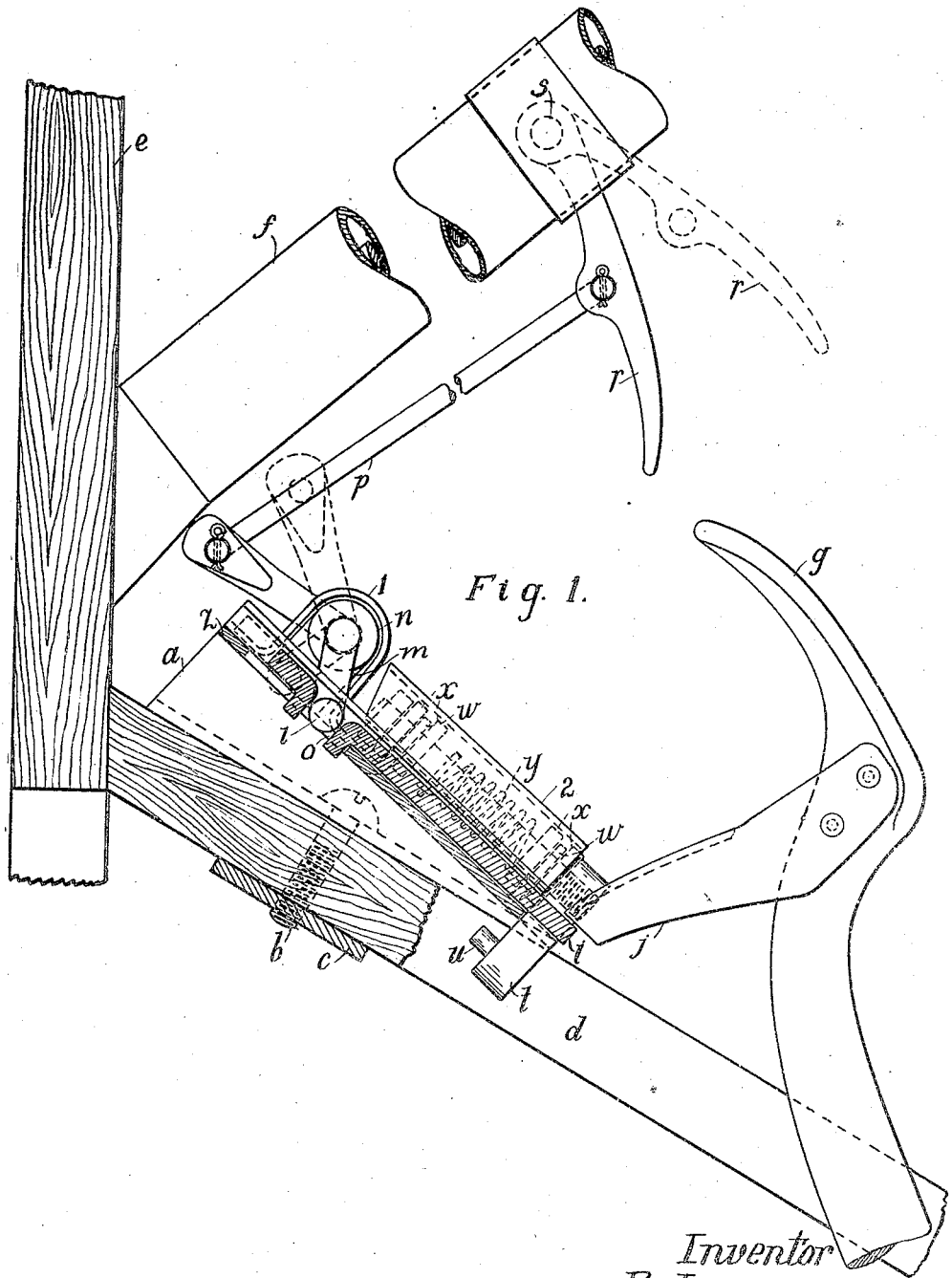
Figure 1 is a sectional elevation of such an apparatus arranged on the footboard of a vehicle with the operating rod and actuating trigger therefor attached to the steering column, the positions assumed in the slightly depressed or "free engine" and the low gear or lower positions of the pedal being shewn in full and dotted lines respectively.
Figure 2:
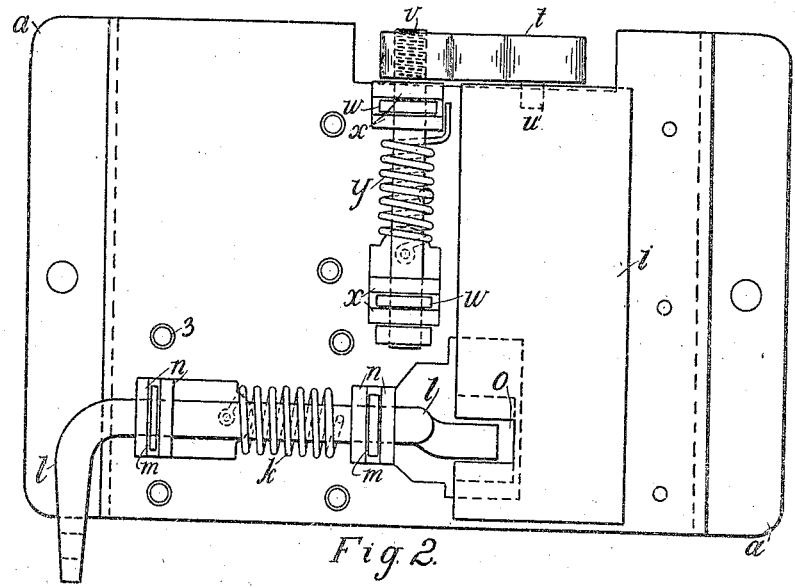
Figure 2 is a plan view of the movable stop and the locking device with the protecting cover plates removed.
Figure 3:
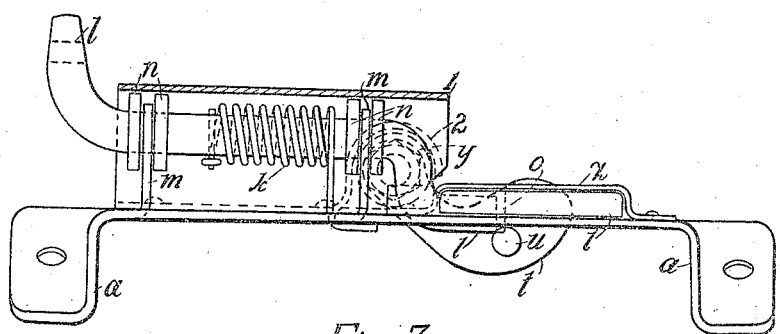
Figure 3 is a front elevation shewing the same parts with the cover plates in position thereon.

It will be apparent that the rod $l$ by its engagement in the slot $o$ and under the influence of the spring $k$ normally presses the plate $i$ forwardly into the position shewn in full lines in Figure 1 and thus into the path of the lug $j$ preventing further downward movement of the pedal $g$. When it is desired to put in the low gear the trigger $r$ is pulled upwards which action by means of the rod $p$ rotates the rod $l$ against the action of the spring $k$ and thus withdraws the plate $i$ out of the path of the lug $j$ into the position shewn in dotted lines, allowing the pedal $g$ to be further depressed and bring the low driving gear into operation.

With the apparatus so far described the release of the trigger $r$ will automatically cause the plate $i$ to return to its operative position but as previously indicated a further feature of the invention resides in the provision of a locking device which will retain the movable stop or plate $i$ in its inoperative position until released by the operation of the pedal $g$.

This locking device comprises a cam member $t$ provided with the stop pin $u$ and mounted on the outer end of the rod $v$ pivotally mounted in the standards $w$ integral with the base plate $a$ and having the fixed collars $x$ to prevent its longitudinal movement. The rod $v$ is encircled by a helical spring $y$ which normally maintains it in such a position as to urge the cam $t$ upwards against the front edge and in the path of the forward movement of the plate $i$ the stop $u$ limiting this upward movement of the cam $t$. Thus when the plate $i$ is withdrawn as previously described the cam $t$ retains it in its inoperative position.

On depression of the pedal $g$ beyond the position shewn in Figure 1 the lug $j$ strikes the cam $t$ and moves it out of the path of the plate $i$. The plate $i$ will then abut against the curved front of the lug $j$ so that the low gear may be engaged and disengaged as often as desired without operating the plate $i$ by means of the trigger $r$. When the requisite speed of the vehicle has been attained the pedal $g$ is released and returns automatically to its normal position thus allowing the plate $i$ to return to its operative position under the influence of the spring $k$.

The plate $i$ and the rods $l$ and $v$ are enclosed within suitable housings $z$, 1 and 2, respectively. attached by screws 3 to the base plate $a$.

The plate $i$ may be permanently held out of its operative position if desired by any simple and suitable means such as for example by a pin attached by a chain to the plate and adapted to be passed through a hole, in the same and a hole in the base plate registering therewith when the plate is in its inoperative position.

What I claim is:—

1. Transmission gear for motor vehicles comprising in combination, a clutch and low gear pedal, a slidably mounted movable plate, a spring-urged rod engaging said plate and maintaining the same in its operative position in the downward path of said pedal, a connecting rod operatively connected to said spring-urged rod and a pivotally mounted trigger secured to said connecting rod.

2. Transmission gear for motor vehicles comprising in combination, a clutch and low gear pedal, a slidably mounted movable plate, a spring-urged rod engaging said plate and maintaining the same in its operative position in the downward path of said pedal, a connecting rod operatively connected to said spring-urged rod and a pivotally mounted trigger secured to said connecting rod, and a locking cam carried by a second spring-urged rod for retaining said movable plate in its inoperative position.

In testimony whereof I affix my signature.

BENJAMIN LAWRENCE.